US011837405B2

(12) United States Patent
Berolini et al.

(10) Patent No.: US 11,837,405 B2
(45) Date of Patent: Dec. 5, 2023

(54) MULTILAYER CERAMIC CAPACITOR

(71) Applicant: KYOCERA AVX Components Corporation, Fountain Inn, SC (US)

(72) Inventors: Marianne Berolini, Greenville, SC (US); Cory Nelson, Simpsonville, SC (US); Seth Fuller, Mauldin, SC (US); Alma Iris Cordova, Townville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 57 days.

(21) Appl. No.: 17/537,827

(22) Filed: Nov. 30, 2021

(65) Prior Publication Data

US 2022/0172891 A1   Jun. 2, 2022

Related U.S. Application Data

(60) Provisional application No. 63/119,184, filed on Nov. 30, 2020.

(51) Int. Cl.
*H01G 4/12*     (2006.01)
*H01G 4/008*    (2006.01)
(Continued)

(52) U.S. Cl.
CPC .......... *H01G 4/008* (2013.01); *H01G 4/1227* (2013.01); *H01G 4/248* (2013.01); *H01G 4/30* (2013.01)

(58) Field of Classification Search
None
See application file for complete search history.

(56) References Cited

U.S. PATENT DOCUMENTS 9,165,713 B2 * 10/2015 Lee .................. H01G 4/012
10,840,018 B2 * 11/2020 Berolini .............. H01G 4/232
(Continued)

FOREIGN PATENT DOCUMENTS

JP    2005216955 A  *  8/2005  .............. H01G 4/12
JP    2006128283      5/2006
(Continued)

OTHER PUBLICATIONS

International Search Report and Written Opinion for PCT/US2021/061072 dated Mar. 18, 2022, 7 pages.

*Primary Examiner* — Dion R. Ferguson
(74) *Attorney, Agent, or Firm* — Dority & Manning, P.A.

(57) ABSTRACT

The present invention is directed to a multilayer ceramic capacitor. The multilayer ceramic capacitor has a first end and a second end that is spaced apart from the first end in a longitudinal direction that is perpendicular to a lateral direction wherein the lateral direction and longitudinal direction are each perpendicular to a Z-direction. The multilayer ceramic capacitor comprises a monolithic body comprising a plurality of dielectric layers and a plurality of electrode layers parallel with the lateral direction. At least one electrode layer includes a first electrode comprising a connecting portion and a central portion extending from the connecting portion in the longitudinal direction wherein the central portion includes a Z-directional edge and the connecting portion includes an edge extending in both the longitudinal direction and the Z-direction and wherein the Z-directional edge of the central portion forms a first angle of from greater than 90° to less than 180° with the edge of the connecting portion. A first external termination disposed along the first end and a second external termination disposed along the second end.

21 Claims, 4 Drawing Sheets

(51) Int. Cl.
*H01G 4/248* (2006.01)
*H01G 4/30* (2006.01)

(56) References Cited

U.S. PATENT DOCUMENTS

| | | | | |
|---|---|---|---|---|
| 2004/0027787 A1* | 2/2004 | Yamauchi | ............ | H01G 4/012 |
| | | | | 361/321.2 |
| 2006/0245141 A1* | 11/2006 | Shirasu | ............ | H01G 4/012 |
| | | | | 361/303 |
| 2012/0151763 A1* | 6/2012 | Jung | ............ | H01G 4/012 |
| | | | | 29/846 |
| 2013/0050898 A1* | 2/2013 | Seo | ............ | H01G 4/012 |
| | | | | 361/321.2 |
| 2013/0170094 A1* | 7/2013 | Kim | ............ | H01G 4/12 |
| | | | | 361/301.4 |
| 2013/0229749 A1* | 9/2013 | Lee | ............ | H01G 4/30 |
| | | | | 156/89.12 |
| 2016/0095223 A1* | 3/2016 | Yoshida | ............ | H01G 4/012 |
| | | | | 361/301.4 |
| 2016/0227650 A1 | 8/2016 | Teraoka | | |
| 2018/0075968 A1* | 3/2018 | Nakanishi | ............ | H01G 4/232 |
| 2019/0131067 A1* | 5/2019 | Berolini | ............ | H01G 13/00 |
| 2019/0180940 A1 | 6/2019 | Ariga et al. | | |
| 2020/0006002 A1* | 1/2020 | Itamochi | ............ | H01G 4/1227 |
| 2021/0090810 A1* | 3/2021 | Han | ............ | H01G 4/012 |
| 2022/0093329 A1* | 3/2022 | Kim | ............ | H01G 4/012 |
| 2022/0172891 A1* | 6/2022 | Berolini | ............ | H01G 4/1218 |

FOREIGN PATENT DOCUMENTS

| | | | | | |
|---|---|---|---|---|---|
| JP | 4770570 | B2 | * | 9/2011 | ............ H01G 4/12 |
| JP | 2012094819 | A | * | 5/2012 | ............ H01G 4/08 |
| JP | 2018133419 | | | 8/2018 | |
| KR | 20190044034 | A | * | 4/2019 | |
| WO | WO2015080847 | | | 6/2015 | |

* cited by examiner

MULTILAYER CERAMIC CAPACITOR

CROSS-REFERENCE TO RELATED APPLICATION

The present application claims filing benefit of U.S. Provisional Patent Application Ser. No. 63/119,184 having a filing date of Nov. 30, 2020, and which is incorporated herein by reference in its entirety.

BACKGROUND OF THE INVENTION

The diversity of modern technical applications creates a need for efficient electronic components and integrated circuits for use therein. Capacitors are a fundamental component used for filtering, coupling, bypassing and other aspects of such modern applications which may include wireless communications, alarm systems, radar systems, circuit switching, matching networks, and many other applications. A dramatic increase in the speed and packing density of integrated circuits requires advancements in coupling capacitor technology in particular. When high-capacitance coupling capacitors are subjected to the high frequencies of many present applications, performance characteristics become increasingly more important. Because capacitors are fundamental to such a wide variety of applications, their precision and efficiency is imperative. Many specific aspects of capacitor design have thus been a focus for improving their performance characteristics.

SUMMARY OF THE INVENTION

In accordance with one embodiment of the present invention, a multilayer ceramic capacitor is disclosed. The multilayer ceramic capacitor has a first end and a second end that is spaced apart from the first end in a longitudinal direction that is perpendicular to a lateral direction wherein the lateral direction and longitudinal direction are each perpendicular to a Z-direction. The multilayer ceramic capacitor comprises a monolithic body comprising a plurality of dielectric layers and a plurality of electrode layers parallel with the lateral direction. At least one electrode layer includes a first electrode comprising a connecting portion and a central portion extending from the connecting portion in the longitudinal direction wherein the central portion includes a Z-directional edge and the connecting portion includes an edge extending in both the longitudinal direction and the Z-direction and wherein the Z-directional edge of the central portion forms a first angle of from greater than 90° to less than 180° with the edge of the connecting portion. A first external termination disposed along the first end and a second external termination disposed along the second end.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE PREFERRED EMBODIMENTS

Figure 1A:
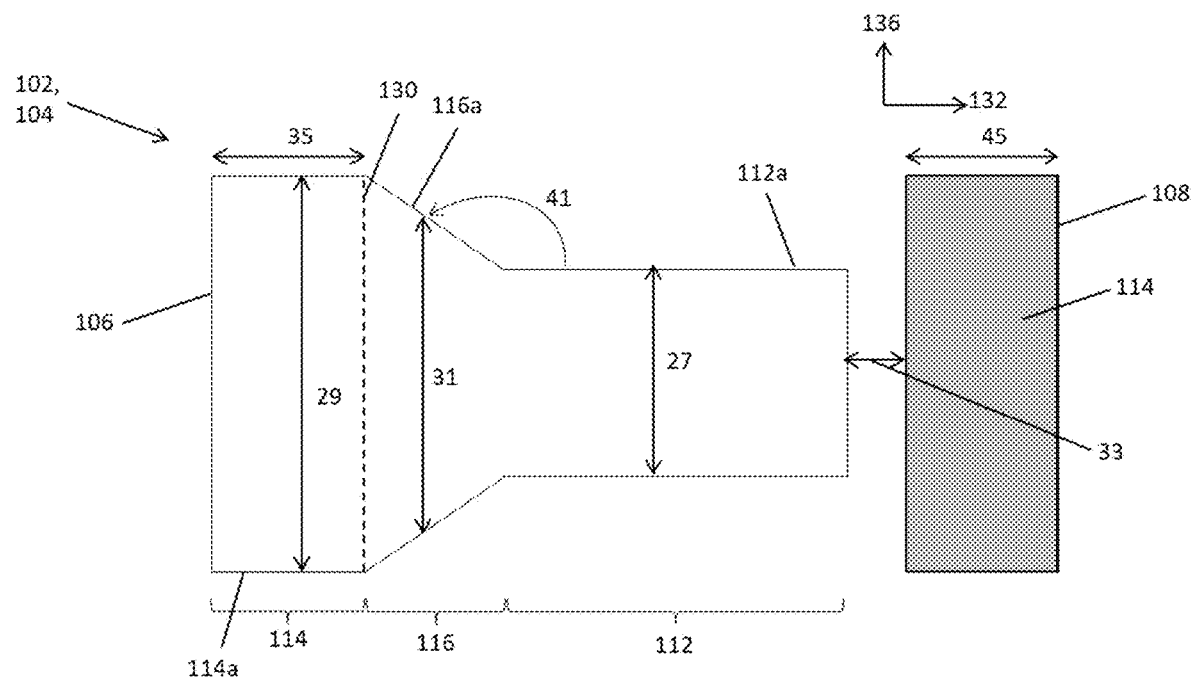
FIG. 1A illustrates a top view of one embodiment of an electrode of the present invention.

It is to be understood by one of ordinary skill in the art that the present discussion is a description of exemplary embodiments only, and is not intended as limiting the broader aspects of the present invention.

Generally speaking, the present invention is directed to a multilayer ceramic capacitor. The multilayer ceramic capacitor contains alternating dielectric layers and electrode layers within a single, monolithic body. The electrode layers may be stacked in a lateral direction such that they would be perpendicular to a mounting surface. In this regard, each electrode layer would extend in a longitudinal direction and a Z-direction, both perpendicular to the lateral direction. Furthermore, the electrode layers may include a first electrode having a certain configuration. For instance, the first electrode may have a connecting portion and a central portion as defined herein wherein an angle of from greater than 90° to less than 180° is formed between the Z-directional edge of the central portion and an edge of the connecting portion. Without intending to be limited by theory, such an angle may provide the first electrode with a generally Y-shaped configuration.

The present inventors have discovered that by utilizing such a configuration for the capacitor and electrode layers therein as well as by utilizing specific materials for the electrodes and dielectrics as described herein, the multilayer ceramic capacitor may have a low equivalent series resistance, in particular across a broad range of frequencies. In particular, such low equivalent series resistance may be realized and beneficial at relatively high frequencies.

In this regard, the capacitor may have an equivalent series resistance of 100 Ohms or less, such as 75 Ohms or less, such as 50 Ohms or less, such as 40 Ohms or less, such as 30 Ohms or less, such as 25 Ohms or less, such as 20 Ohms or less, such as 15 Ohms or less, such as 10 Ohms or less, such as 8 Ohms or less, such as 5 Ohms or less, such as 3 Ohms or less, such as 2 Ohms or less, such as 1 Ohm or less. The equivalent series resistance may be 0.01 Ohms or more, such as 0.1 Ohms or more, such as 0.2 Ohms or more, such as 0.3 Ohms or more, such as 0.5 Ohms or more, such as 0.8 Ohms or more, such as 1 Ohm or more, such as 2 Ohms or more, such as 3 Ohms or more, such as 5 Ohms or more, such as 8 Ohms or more, such as 10 Ohms or more. Such equivalent series resistance may be realized when measured across a frequency range of from 1 GHz to 10 GHz, such as from 2 GHz to 10 GHz, such as from 3 GHz to 10 GHz, such as from 4 GHz to 9 GHz. The equivalent series resistance may be measured using general techniques as known in the art and as described herein.

In some embodiments the capacitor may exhibit the aforementioned equivalent series resistance at about a single frequency. For instance, in one embodiment, the capacitor may exhibit the aforementioned equivalent series resistance at about 2 GHz, such as at about 3 GHz, such as at about 4 GHz, such as at about 5 GHz, such as at about 6 GHz, such as at about 7 GHz, such as at about 8 GHz, such as at about 9 GHz, such as at about 10 GHz. In one embodiment, the capacitor may exhibit the aforementioned equivalent series resistance at more than one of the aforementioned frequencies.

In addition to exhibiting a relatively low equivalent series resistance due to the selective control over the particular configuration of the electrodes and capacitor as well as the materials for the electrodes and dielectrics, the resulting capacitor may also exhibit a low equivalent series inductance. For instance, the equivalent series inductance may be about 1 nanohenry or less, in some embodiments about 750 picohenries or less, in some embodiments about 350 picohenries or less, in some embodiments from about 1 femtohenry to about 100 picohenries, and in some embodiments, from about 50 femtohenries to about 10 picohenries. The low equivalent series inductance values may also be characterized by a low impedance value, which is a reflection of parasitic inductance.

The capacitor of the present invention can be further described according to the embodiments as illustrated in FIGS. 1A-1F and 2.

Figure 1B:
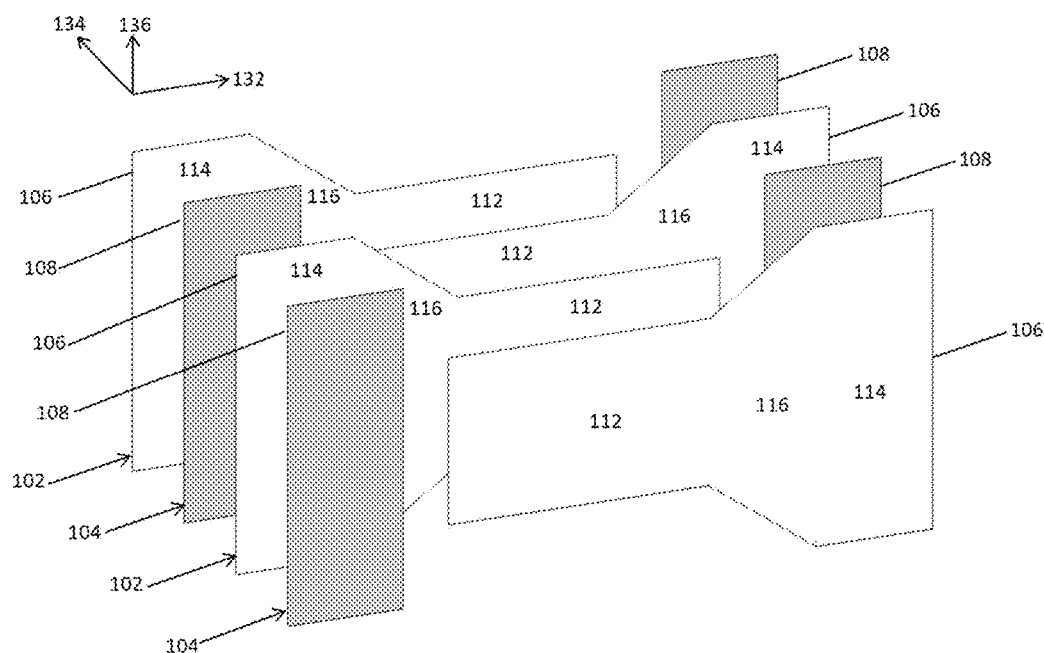
FIG. 1B illustrates a perspective view of one embodiment of an arrangement of electrode layers of the present invention.
Figure 1C:
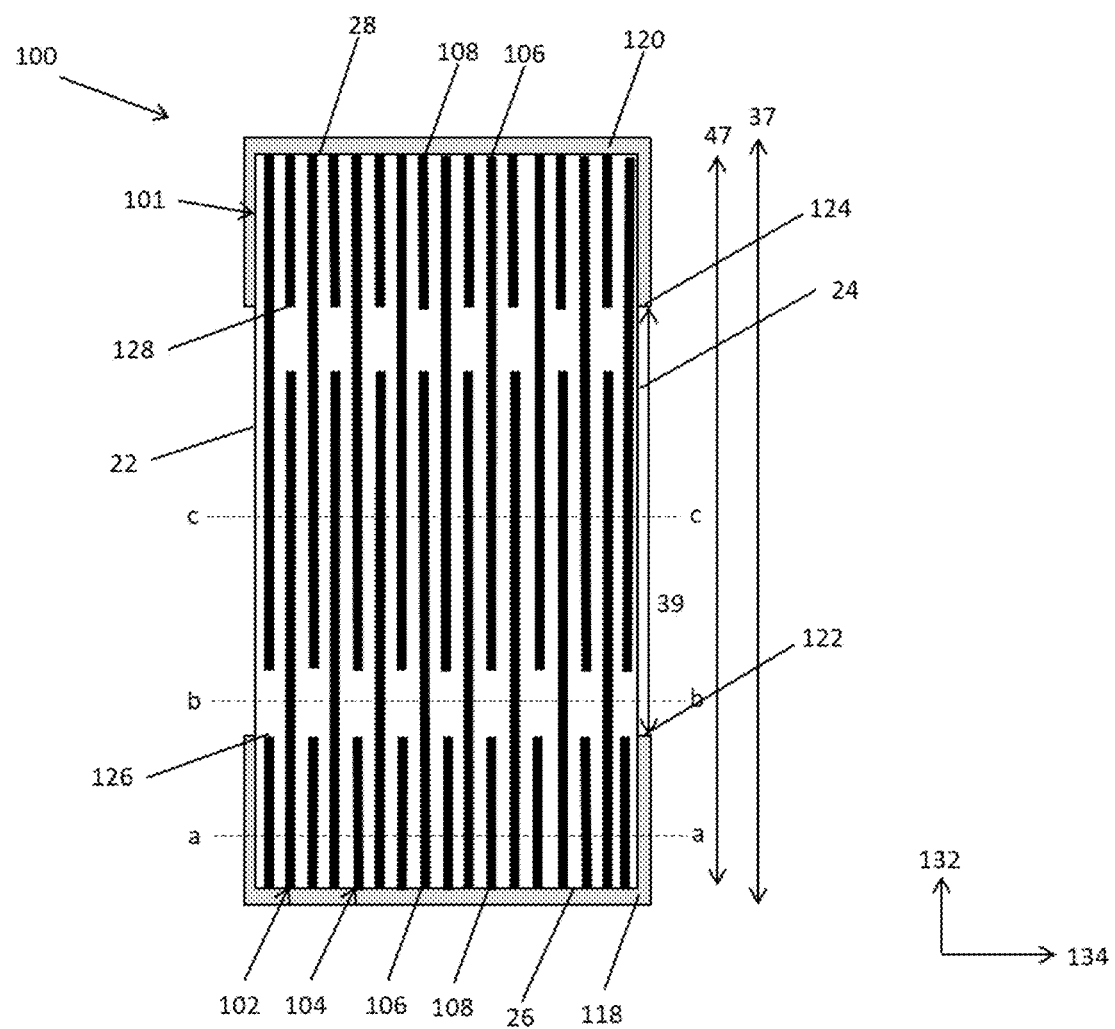
FIG. 1C illustrates a top cross-sectional view of one embodiment of a capacitor of the present invention.
Figure 1D:
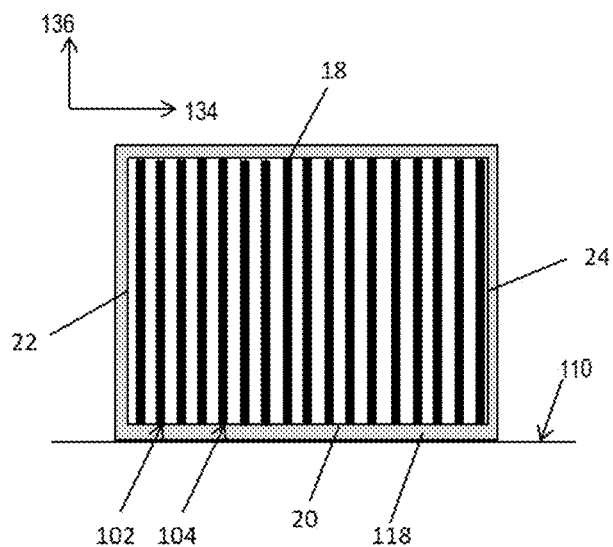
FIGS. 1D-1F illustrate side cross-sectional views of the capacitor of FIG. 1C.
Figure 1E:
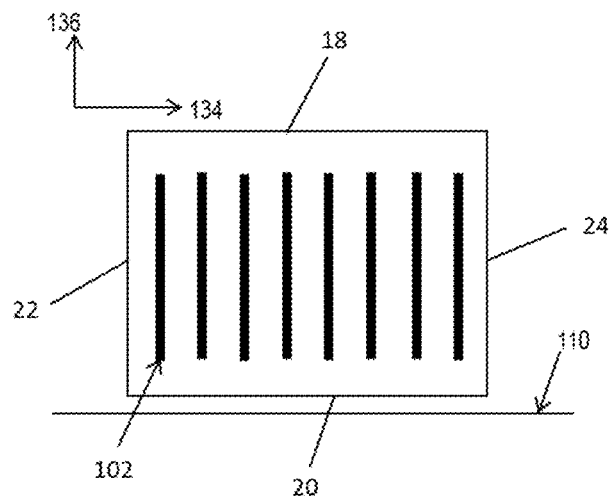
Figure 1F:
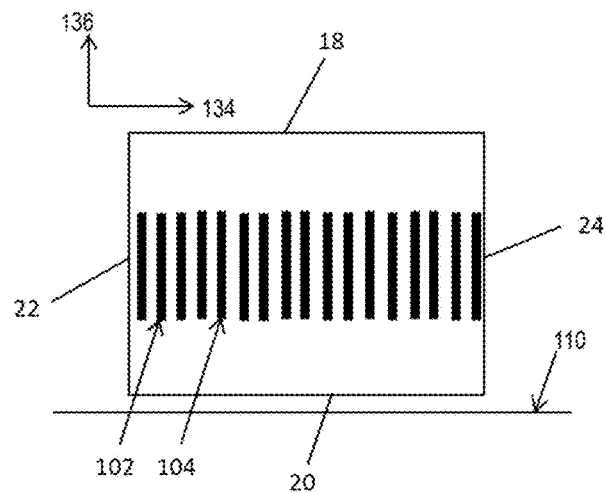

Turning to FIGS. 1A-1F, one embodiment of a multilayer ceramic capacitor 100 is disclosed. In general, the capacitor 100 includes a stacked body 101 containing alternating dielectric layers and electrode layers 102, 104. The stacked body 101 includes six surfaces. For instance, the stacked body 101 includes a top surface 18 and an opposing bottom surface 20 in the Z-direction 136 or width direction. The stacked body 101 may also include two end surfaces 26, 28 extending between the top surface and the bottom surface. The end surfaces 26, 28 may be opposed to each other in a longitudinal direction 132 or length direction. The end surfaces 26, 28 may extend in a lateral direction 134 and a Z-direction 136. The stacked body 101 may also include two side surfaces 22, 24 also extending between the top surface and the bottom surface. The side surfaces may extend in a longitudinal direction 132 and a Z-direction 136. In one embodiment, the side surfaces may be parallel with the major face of the electrodes. Similarly, in one embodiment, the top and bottom surfaces may be perpendicular with the major face of the electrodes. Accordingly, in one embodiment, the stacked body 101 includes at least six total surfaces (e.g., one top, one bottom, two sides, and two ends). In this regard, the stacked body 101 may have a parallelepiped shape, such as a rectangular parallelepiped shape. Furthermore, as illustrated in FIGS. 1D-1F, the capacitor 100 may be mounted to a mounting surface 110, such as a printed circuit board or substrate. In this regard, the multilayer ceramic capacitor may be configured for mounting to a mounting surface such that the electrode layers are perpendicular to the mounting surface.

The multilayer ceramic capacitor 100 may include a plurality of electrode layers 102, 104 and dielectric layers stacked in the lateral direction 134. Some dielectric layers may include electrode layers formed thereon. In general, the thickness of the dielectric layers and the electrode layers is not limited and can be any thickness as desired depending on the performance characteristics of the capacitor. For instance, the thickness of the electrode layers can be, but is not limited to, being about 500 nm or greater, such as about 1 µm or greater, such as about 1.5 µm or greater, such as about 2 µm or greater, such as about 3 µm or greater, such as about 4 µm or greater. The thickness of the electrode layers may be about 10 µm or less, such as about 5 µm or less, such as about 4 µm or less, such as about 3 µm or less, such as about 2.5 µm or less, such as about 2 µm or less. For instance, the electrode layers may have a thickness of from about 1 µm to about 2 µm. In addition, in one embodiment, the thickness of the dielectric layer may be defined according to the aforementioned thickness of the electrode layers. Also, it should be understood that such thicknesses of the dielectric layers may also apply to the layers between any electrode layers.

FIG. 1A illustrates a top view of one embodiment of an electrode configuration according to aspects of the present disclosure. More specifically, the electrode layers may include first electrode layers 102 and second electrode layers 104 in an alternating arrangement, for example as described below with reference to FIG. 1B. Referring to FIG. 1A, each electrode layer 102, 104 may include a first electrode 106 and a second electrode 108. The first electrode 106 may have a base portion 114. For instance, the base portion 114 of the first electrode 106 may extend in a longitudinal direction and have a lateral edge that extends in a Z-direction. The second electrode 108 may have a base portion 114. For instance, the base portion 114 of the second electrode 108 may also extend in a longitudinal direction and have a lateral edge that extends in a Z-direction.

The first electrode 106 may also have a central portion 112. The central portion 112 may extend from the base portion 114 in the longitudinal direction 132. The central portion 112 of the first electrode 106 may have a first width 27 for example extending in the Z-direction 136. In addition, the base portion 114 of the first electrode may have a second width 29, for example extending in the Z-direction. In this regard, the location of the first width 27 may be offset from the location of the second width 29 in the longitudinal direction 132 such that the location of the second width 29 is closer to the external termination to which it is electrically connected. Such a configuration may allow for adjustment of an overlapping area between central portions 112 of adjacent electrodes in the lateral direction 134. In one embodiment, the second width 29 of the base portion 114 may be greater than the first width 27 of the central portion 112. Such distinctions in width are illustrated in FIGS. 1D-1F which illustrate cross-sectional views of the capacitor of FIG. 1C along lines a-a, b-b, and c-c, respectively.

In addition, a central end gap distance 33 may be formed in the longitudinal direction between the longitudinal end of the central portion 112 of the first electrode 106 and the longitudinal end of the base portion 114 of the second electrode 108. Accordingly, in one embodiment, a ratio of the central end gap distance 33 to the capacitor length 37 may be 0.01 or more, such as 0.05 or more, such as 0.1 or more, such as 0.2 or more, such as 0.3 or more, such as 0.4 or more. The ratio may be such as 0.5 or less, such as 0.4 or less, such as 0.3 or less, such as 0.2 or less, such as 0.1 or less.

Furthermore, the first electrode 106 may also have a connecting portion 116. The connecting portion 116 may extend from the base portion 114 in the longitudinal direction 132. In particular, the connecting portion 116 may extend between and connect the base portion 114 and the central portion 112. The connecting portion 116 may have a third width 31 for example extending in the Z-direction 136. In this regard, the location of the third width 31 may be offset from the location of the first width 27 and the location of the second width 29 in the longitudinal direction 132. In one embodiment, the third width 31 of the connecting portion may be less than the second width 29 of the base portion 114. Also, the third width 31 of the connecting portion may be greater than the first width 27 of the central portion 112. In this regard, the location of the third width 31 may be between the location of the first width 27 and the location of the second width 29.

In one embodiment, the central portion 112 may have a Z-directional edge 112a extending in the longitudinal direction 132. Such Z-directional edge may form an angle 41 with an edge 116a of the connecting portion 116. Such angle 41 may be greater than 90° and less than 180°. For instance, such angle 41 may be greater than 90°, such as 95° or more, such as 100° or more, such as 110° or more, such as 120° or more, such as 130° or more, such as 140° or more. Such angle 41 may be less than 180°, such as 175° or less, such as 170° or less, such as 160° or less, such as 150° or less, such as 140° or less, such as 130° or less, such as 120° or less, such as 110° or less. Without intending to be limited by theory, such configuration may provide for a generally Y-shaped electrode configuration.

Figure 2:
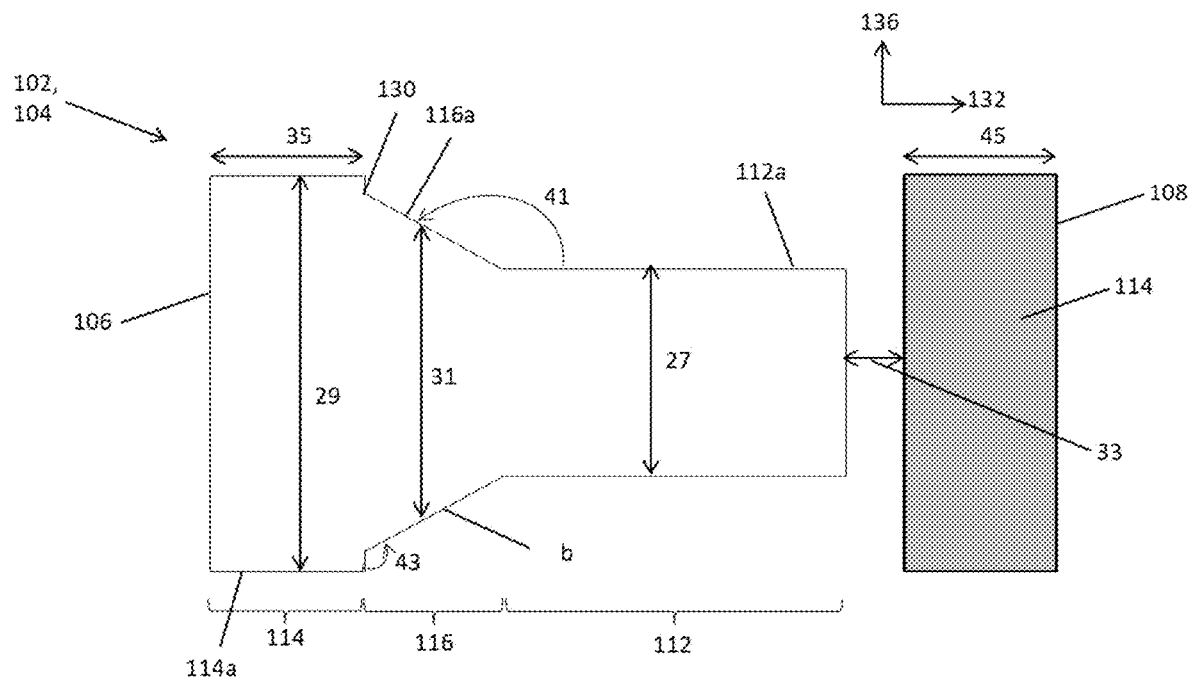
FIG. 2 illustrates a top view of another embodiment of an electrode of the present invention.

In a further embodiment as illustrated in FIG. 2, the connecting portion 116 may also form an angle 43 with the base portion 114. For instance, the base portion 114 may have a longitudinal edge 130 extending in the Z-direction 136. Such longitudinal edge may form an angle 43 with an edge 116a of the connecting portion 116. Such angle 43 may be greater than 90° and less than 180°. For instance, such angle 43 may be greater than 90°, such as 95° or more, such as 100° or more, such as 110° or more, such as 120° or more, such as 130° or more, such as 140° or more. Such angle 43 may be less than 180°, such as 175° or less, such as 170° or less, such as 160° or less, such as 150° or less, such as 140° or less, such as 130° or less, such as 120° or less, such as 110° or less.

Such edge 116a of the connecting portion 116 may extend in both the longitudinal direction 132 and the Z-direction 136. In one embodiment, such edge may be a linear edge such that the edge is substantially linear. Such linear edge is illustrated in FIGS. 1A and 2. In another embodiment, such edge may be a curved edge having a curved/rounded configuration.

As illustrated in FIGS. 1A and 2, the base portion 114 of first electrode 106 may also have a certain length 35 extending in the longitudinal direction 132. In this regard, the base portion may have a Z-directional edge 114a extending in the longitudinal direction. In general, such length of the base portion may be defined as the distance between the leading edge of the first electrode and base portion adjacent a side surface and external termination and the point of transition between the base portion and the connecting portion. For instance, the aforementioned Z-directional edge 114a may generally have a slope of 0° and the point at which the slope changes may be considered the aforementioned point of transition. Regardless, such length may be 0.05 or more, such as 0.1 or more, such as 0.15 or more, such as 0.2 or more, such as 0.3 or more the capacitor length 37 as defined herein. Such length 35 may be 0.5 or less, such as 0.4 or less, such as 0.3 or less, such as 0.25 or less, such as 0.2 or less, such as 0.15 or less the capacitor length 37.

As also illustrated in FIGS. 1A and 2, the base portion 114 of second electrode 108 may also have a certain length 45 extending in the longitudinal direction 132. Such length may be 0.05 or more, such as 0.1 or more, such as 0.15 or more, such as 0.2 or more, such as 0.3 or more the capacitor length 37. Such length 35 may be 0.5 or less, such as 0.4 or less, such as 0.3 or less, such as 0.25 or less, such as 0.2 or less, such as 0.15 or less the capacitor length 37.

In one embodiment, the aforementioned lengths 35 and 45 may be different. In one particular embodiment, the aforementioned lengths 35 and 45 may be substantially the same.

Furthermore, the first external termination 118 may have a first longitudinal edge 122. The first longitudinal edge may extend in a Z-direction 136 and/or a lateral direction 134. The first longitudinal edge 122 of the first external termination 118 may substantially align with the longitudinal edge 130 of the base portion 114 of first electrode 106 in the longitudinal direction. Such longitudinal edge may be at a location wherein the base portion 114 ends and the connecting portion 116 begins. For instance, the first longitudinal edge 122 of the first external termination 118 may be within 5%, such as within 4%, such as within 3%, such as within 2%, such as within 1%, such as within 0.8%, such as within 0.6%, such as within 0.5%, such as within 0.4%, such as within 0.3%, such as within 0.2%, such as within 0.1% of the longitudinal edge 130 of the base portion 114 of first electrode 106 in the longitudinal direction based on the length of the base portion 114 of first electrode 106.

Similarly, the second external termination 120 may have a second longitudinal edge 124. The second longitudinal edge may extend in a Z-direction 136 and/or a lateral direction 134. The second longitudinal edge 124 of the second external termination 120 may substantially align with a longitudinal edge 130 of the base portion 114 of first electrode 106 in the longitudinal direction. Such longitudinal edge may be at a location wherein the base portion 114 ends and the connecting portion 116 begins. For instance, the second longitudinal edge 124 of the second external termination 120 may be within 5%, such as within 4%, such as within 3%, such as within 2%, such as within 1%, such as within 0.8%, such as within 0.6%, such as within 0.5%, such as within 0.4%, such as within 0.3%, such as within 0.2%, such as within 0.1% of the longitudinal edge 130 of the base portion 114 of first electrode 106 in the longitudinal direction based on the length of the base portion 114 of first electrode 106.

In addition, the first longitudinal edge 122 of the first external termination 118 may substantially align with the longitudinal edge 126 of the base portion 114 of second electrode 108 in the longitudinal direction. For instance, the first longitudinal edge 122 of the first external termination 118 may be within 5%, such as within 4%, such as within 3%, such as within 2%, such as within 1%, such as within 0.8%, such as within 0.6%, such as within 0.5%, such as within 0.4%, such as within 0.3%, such as within 0.2%, such as within 0.1% of the longitudinal edge 126 of the base portion 114 of second electrode 108 in the longitudinal direction based on the length of the base portion 114 of second electrode 108.

Similarly, the second longitudinal edge 124 of the second external termination 120 may substantially align with the longitudinal edge 128 of the base portion 114 of second electrode 108 in the longitudinal direction. For instance, the second longitudinal edge 124 of the second external termination 120 may be within 5%, such as within 4%, such as within 3%, such as within 2%, such as within 1%, such as within 0.8%, such as within 0.6%, such as within 0.5%, such as within 0.4%, such as within 0.3%, such as within 0.2%, such as within 0.1% of the longitudinal edge 128 of the base portion 114 of second electrode 108 in the longitudinal direction based on the length of the base portion 114 of second electrode 108.

As indicated herein, the dielectric layers and electrode layers may be stacked to form a stacked body. Referring to FIG. 1B, a plurality of first electrode layers 102 and a plurality of second electrode layers 104 may be arranged in an alternating, mirrored configuration. For instance, the electrode layers may interleaved in an opposed and spaced apart relation with a dielectric layer located between each electrode layer. As illustrated, the central portions 112 of the respective electrode layers at least partially overlap. FIG. 1B illustrates a total of four electrode layers; however, it should be understood that any number of electrode layers may be employed to obtain the desired capacitance for the desired application. For instance, the capacitor may include 10 or more, such as 25 or more, such as 50 or more, such as 100 or more, such as 200 or more, such as 300 or more, such as 500 or more, such as 600 or more, such as 750 or more, such as 1,000 or more internal electrode layers. The capacitor may include 5,000 or less, such as 4,000 or less, such as 3,000 or less, such as 2,000 or less, such as 1,500 or less, such as 1,000 or less, such as 750 or less, such as 500 or less, such as 400 or less, such as 300 or less, such as 250 or less, such as 200 or less, such as 175 or less, such as 150 or less internal electrode layers.

The present invention provides a multilayer ceramic capacitor having a unique electrode arrangement and configuration that provides various benefits and advantages as indicated herein. In this regard, it should be understood that the materials employed in constructing the capacitor may not be limited and may be any as generally employed in the art and formed using any method generally employed in the art.

In general, the dielectric layers may typically be formed from certain types of materials having certain dielectric constants. For instance, in one embodiment, the dielectric layers may be formed from a material having a relatively high dielectric constant (K). Such dielectric constant may be more than 125, such as 200 or more, such as 500 or more, such as 1,000 or more to about 40,000 or less, such as about 30,000 or less, such as about 20,000 or less. In other embodiments, the dielectric layers may be formed from a material having a relatively low dielectric constant (K). For instance, the dielectric constant may be 10 or more, such as 15 or more, such as 20 or more, such as 30 or more, such as 40 or more, such as 50 or more, such as 60 or more, such as 70 or more, such as 80 or more, such as 90 or more. The dielectric constant may be 125 or less, such as 110 or less, such as 100 or less, such as 90 or less, such as 80 or less, such as 70 or less, such as 60 or less, such as 50 or less, such as 40 or less, such as 30 or less, such as 20 or less.

In general, these materials may include a ceramic. The ceramic may be provided in a variety of forms, such as a wafer (e.g., pre-fired) or a dielectric material that is co-fired within the device itself. Particular examples of these types of materials include, for instance, NPO (COG), X7R (from about 3,000 to about 7,000), X7S, Z5U, and/or Y5V materials. It should be appreciated that the aforementioned materials are described by their industry-accepted definitions, some of which are standard classifications established by the Electronic Industries Alliance (EIA), and as such should be recognized by one of ordinary skill in the art.

In one particular embodiment, the dielectric layers may comprise an NPO (COG) material. In general, these materials are recognized as EIA Class I ceramic materials. These materials may have a relatively low temperature coefficient. For instance, without intending to be limited by theory, these materials may have minimal variance in capacitance as a function of temperature. In addition, such materials may also have relatively low dielectric constants as indicated above. Accordingly, such materials may have a relatively small capacitance per volume.

For example, these materials may have a capacitance change with temperature of 0±30 ppm/° C., such as 0±25 ppm/° C., such as 0±20 ppm/° C., such as 0±15 ppm/° C., such as 0±10 ppm/° C., such as 0±5 ppm/° C., such as 0 ppm/° C. In other words, these materials may undergo a change in ±0.3%, such as ±0.25%, such as ±0.2%, such as ±0.15%, such as ±0.1%, such as ±0.05%, such as 0% from −55° C. to 125° C. For the aforementioned, the capacitance value at 25° C. may be used as the reference point. In this regard, the capacitance may range from 10 pF to 0.01 µF. For instance, the capacitance may be 0.5 pF or more, such as 1 pF or more, such as 5 pF or more, such as 10 pF or more, such as 50 pF or more, such as 100 pF or more, such as 200 pF or more, such as 500 pF or more, such as 800 pF or more, such as 1 nF or more, such as 5 nF or more. The capacitance may be 10 nF or less, such as 8 nF or less, such as 5 nF or less, such as 3 nF or less, such as 1 nF or less, such as 900 pF or less, such as 700 pF or less, such as 500 pF or less, such as 300 pF or less, such as 200 pF or less, such as 100 pF or less, such as 50 pF or less, such as 20 pF or less. The aforementioned references to capacitance may refer to the capacitance of the capacitor.

These ceramic materials, including the NPO (COG) ceramic materials, and resulting dielectric layer may include a perovskite, such as barium titanate and related solid solutions (e.g., barium-strontium titanate, barium calcium titanate, barium zirconate titanate, barium strontium zirconate titanate, barium calcium zirconate titanate, etc.), lead titanate and related solid solutions (e.g., lead zirconate titanate, lead lanthanum zirconate titanate), sodium bismuth titanate, and so forth. In one particular embodiment, for instance, barium strontium titanate ("BSTO") of the formula $Ba_xSr_{1-x}TiO_3$ may be employed, wherein x is from 0 to 1, in some embodiments from about 0.15 to about 0.65, and in some embodiments, from about from 0.25 to about 0.6. In this regard, in one embodiment, the dielectric layers may include a titanate. Other suitable perovskites may include, for instance, $Ba_xCa_{1-x}TiO_3$ where x is from about 0.2 to about 0.8, and in some embodiments, from about 0.4 to about 0.6, $Pb_xZr_{1-x}TiO_3$ ("PZT") where x ranges from about 0.05 to about 0.4, lead lanthanum zirconium titanate ("PLZT"), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)_5KHb_2PO_4$. Still additional complex perovskites may include $A[B1_{1/3}B2_{2/3}]O_3$ materials, where A is $Ba_xSr_{1-x}$ (x can be a value from 0 to 1); B1 is $Mg_yZn_{1-y}$ (y can be a value from 0 to 1); B2 is $Ta_zNb_{1-z}$ (z can be a value from 0 to 1). In this regard, in one embodiment, the materials and corresponding dielectric layers may include a titanate, such as a barium titanate.

In a further embodiment, these ceramic materials, including the NPO (COG) ceramic materials, and resulting dielectric layer may include an oxide. For example, the oxide may include zinc, zirconium, niobium, magnesium, tantalum, titanium, cobalt, strontium, neodymium, samarium, silicon, etc., or a mixture thereof. In one embodiment, the oxide may include a rare earth oxide. In one embodiment, the ceramic material may include at least titanium dioxide. In one embodiment, the ceramic material may include zirconium dioxide. In a further embodiment, the ceramic material may include silicon dioxide. In one embodiment, the ceramic material may include titanium dioxide, zirconium dioxide, silicon dioxide, or a mixture thereof.

In a further embodiment, these ceramic materials, including the NPO (COG) ceramic materials, and resulting dielectric layer may include a combination of a titanate and an oxide. In particular, they may include a combination of a barium titanate and an oxide.

The electrodes and electrode layers may be formed from any of a variety of different metals as is known in the art. The electrode layers may be made from a metal, such as a conductive metal. The materials may include precious metals (e.g., silver, gold, palladium, platinum, etc.), base metals (e.g., copper, tin, nickel, chrome, titanium, tungsten, aluminum, zinc, etc.), and so forth, as well as various combinations thereof. Sputtered titanium/tungsten (Ti/W) alloys, as well as respective sputtered layers of chrome, nickel and gold, may also be suitable. The electrodes may also be made of a low resistive material, such as silver, copper, gold, aluminum, palladium, etc. In one particular embodiment, the electrode layers may comprise nickel or an alloy thereof. In another particular embodiment, the electrode layers may comprise copper or an alloy thereof.

Each electrode layer 102, 104 may include one or more electrodes, for example as described below with reference to FIGS. 1A-1C. For example, in some embodiments each electrode layer 102, 104 may include a first electrode 106 and a second (counter) electrode 108.

In general, the capacitor as described herein references certain electrode configurations. However, it should be understood that other types of electrodes and/or electrode layers as known in the art may also be utilized within the capacitor. For instance, these other electrodes and/or electrode layers may include, but are not limited to, shield electrodes, dummy electrodes, floating electrodes, etc. For instance, in one embodiment, the capacitor may include shield electrodes. In another embodiment, the capacitor may include dummy electrodes. In a further embodiment, the capacitor may include floating electrodes. In addition, such electrodes may have any shape as generally known in the art. However, in one embodiment, the capacitor may not include shield electrodes, dummy electrodes, and/or floating electrodes. For instance, in one embodiment, the capacitor may not include shield electrodes. In another embodiment, the capacitor may not include dummy electrodes. In a further embodiment, the capacitor may not include floating electrodes.

In addition to the stacked body 101 including the dielectric layers and the electrode layers 102, 104, the multilayer ceramic capacitor 100 may also contain a first external termination 118 and a second external termination 120. The first external termination 118 may be connected, such as electrically connected, to the first electrode 106 of a first electrode layer 102 and a second (counter) electrode 108 of the second electrode layer 104. The second external termination 120 may be connected, such as electrically connected, to the first electrode 106 of the second electrode layer 104 and the second (counter) electrode 108 of the first electrode layer 102.

The external terminations 118 and 120 may be formed on respective end surfaces 26 and 28 of the stacked body 101. However, the external terminations 118 and 120 may also be present on other surfaces. For instance, the external terminations may extend to the top and bottom surfaces as well as the two side surfaces 22, 24. In particular, external termination 118 may extend to top surface 18, bottom surface 20, and side surfaces 22, 24. Similarly, external termination 120 may extend to top surface 18, bottom surface 20, and side surfaces 22, 24.

In general, the external terminations may have an average thickness of about 500 μm or less, such as about 400 μm or less, such as about 250 μm or less, such as about 150 μm or less, such as about 100 μm or less, such as about 50 μm or less, such as about 40 μm or less, such as about 30 μm or less, such as about 25 μm or less, such as about 20 μm or less. The external terminations may have an average thickness of about 5 μm or more, such as about 10 μm or more, such as about 15 μm or more, such as about 25 μm or more, such as about 50 μm or more, such as about. For instance, the external terminations may have an average thickness of from about 5 μm to about 50 μm, such as from about 10 μm to about 40 μm, such as from about 15 μm to about 30 μm, such as from about 15 μm to about 25 μm. In one embodiment, the aforementioned thicknesses refer to the average thickness of the entire external termination, for example one including more than one layer. In another embodiment, the aforementioned thicknesses refer to the average thickness of a single layer of an external termination.

Regarding embodiments discussed herein, the external terminations may be formed from any of a variety of different metals as is known in the art. The external terminations may be made from a metal, such as a conductive metal. The materials may include precious metals (e.g., silver, gold, palladium, platinum, etc.), base metals (e.g., copper, tin, nickel, chrome, titanium, tungsten, etc.), and so forth, as well as various combinations thereof. In one particular embodiment, the external terminations may comprise copper or an alloy thereof.

The external terminations can be formed using any method generally known in the art. The external terminations may be formed using techniques such as sputtering, painting, printing, electroless plating or fine copper termination (FCT), electroplating, plasma deposition, propellant spray/air brushing, and so forth.

In one embodiment, the external terminations may be formed such that the external terminations are relatively thick. For instance, such terminals may be formed by applying a thick film stripe of a metal to exposed portions of electrode layers (e.g., by dipping the capacitor in a liquid external termination material). Such metal may be in a glass matrix and may include silver or copper. As an example, such strip may be printed and fired onto the capacitor. Thereafter, additional plating layers of metal (e.g., nickel, tin, solder, etc.) may be created over the termination strips such that the capacitor is solderable to a substrate. Such application of thick film stripes may be conducted using any method generally known in the art (e.g., by a termination machine and printing wheel for transferring a metal-loaded paste over the exposed electrode layers).

The thick-plated external terminations may have an average thickness of about 500 μm or less, such as about 300 μm or less, such as about 200 μm or less, such as about 150 μm or less, such as about 100 μm or less, such as about 80 μm or less. The thick-plated external terminations may have an average thickness of about 25 μm or more, such as about 35 μm or more, such as about 50 μm or more, such as about 75 or more μm. For instance, the thick-plated external terminations may have an average thickness of from about 25 μm to about 150 μm, such as from about 35 μm to about 125 μm, such as from about 50 μm to about 100 μm. In one embodiment, the aforementioned thicknesses refer to the average thickness of the entire external termination, for example one including more than one layer. In another embodiment, the aforementioned thicknesses refer to the average thickness of a single layer of an external termination.

In another embodiment, the external terminations may be formed such that the external termination is a thin-film plating of a metal. Such thin-film plating can be formed by depositing a conductive material, such as a conductive metal, on an exposed portion of an electrode layer. For instance, a leading edge of an electrode layer may be exposed such that it may allow for the formation of a plated termination.

The thin-plated external terminations may have an average thickness of about 50 μm or less, such as about 40 μm or less, such as about 30 μm or less, such as about 25 μm or less. The thin-plated external terminations may have an average thickness of about 5 μm or more, such as about 10

µm or more, such as about 15 µm or more. For instance, the external terminations may have an average thickness of from about 5 µm to about 50 µm, such as from about 10 µm to about 40 µm, such as from about 15 µm to about 30 µm, such as from about 15 µm to about 25 µm. In one embodiment, the aforementioned thicknesses refer to the average thickness of the entire external termination, for example one including more than one layer. In another embodiment, the aforementioned thicknesses refer to the average thickness of a single layer of an external termination.

In general, the external termination may comprise a plated termination. For instance, the external termination may comprise an electroplated termination, an electroless plated termination, or a combination thereof. For instance, an electroplated termination may be formed via electrolytic plating. An electroless plated termination may be formed via electroless plating.

When multiple layers constitute the external termination, the external termination may include an electroplated termination and an electroless plated termination. For instance, electroless plating may first be employed to deposit an initial layer of material. The plating technique may then be switched to an electrochemical plating system which may allow for a faster buildup of material.

When forming the plated terminations with either plating method, a leading edge of the electrode layers that is exposed from the main body of the capacitor is subjected to a plating solution. By subjecting, in one embodiment, the capacitor may be dipped into the plating solution.

The plating solution contains a conductive material, such as a conductive metal, is employed to form the plated termination. Such conductive material may be any of the aforementioned materials or any as generally known in the art. For instance, the plating solution may be a nickel sulfamate bath solution or other nickel solution such that the plated layer and external termination comprise nickel. Alternatively, the plating solution may be a copper acid bath or other suitable copper solution such that the plated layer and external termination comprise copper.

Additionally, it should be understood that the plating solution may comprise other additives as generally known in the art. For instance, the additives may include other organic additives and media that can assist in the plating process. Additionally, additives may be employed in order to employ the plating solution at a desired pH. In one embodiment, resistance-reducing additives may be employed in the solutions to assist with complete plating coverage and bonding of the plating materials to the capacitor and exposed leading edges of the electrodes.

The capacitor may be exposed, submersed, or dipped in the plating solution for a predetermined amount of time. Such exposure time is not necessarily limited but may be for a sufficient amount of time to allow for enough plating material to deposit in order to form the plated termination. In this regard, the time should be sufficient for allowing the formation of a continuous connection among the desired exposed, adjacent leading edges of the electrodes.

In general, the difference between electrolytic plating and electroless plating is that electrolytic plating employs an electrical bias, such as by using an external power supply. The electrolytic plating solution may be subjected typically to a high current density range, for example, ten to fifteen amp/ft$^2$ (rated at 9.4 volts). A connection may be formed with a negative connection to the capacitor requiring formation of the plated terminations and a positive connection to a solid material (e.g., Cu in Cu plating solution) in the same plating solution. That is, the capacitor is biased to a polarity opposite that of the plating solution. Using such method, the conductive material of the plating solution is attracted to the metal of the exposed leading edge of the electrode layers.

Prior to submersing or subjecting the capacitor to a plating solution, various pretreatment steps may be employed. Such steps may be conducted for a variety of purposes, including to catalyze, to accelerate, and/or to improve the adhesion of the plating materials to the leading edges of the electrodes.

Additionally, prior to plating or any other pretreatment steps, an initial cleaning step may be employed. Such step may be employed to remove any oxide buildup that forms on the exposed edges of the electrodes. This cleaning step may be particularly helpful to assist in removing any buildup of nickel oxide when the internal electrodes or other conductive elements are formed of nickel. Component cleaning may be effected by full immersion in a preclean bath, such as one including an acid cleaner. In one embodiment, exposure may be for a predetermined time, such as on the order of about 10 minutes. Cleaning may also alternatively be effected by chemical polishing or harperizing steps.

In addition, a step to activate the exposed metallic leading edges of the electrodes may be performed to facilitate depositing of the conductive materials. Activation can be achieved by immersion in palladium salts, photo patterned palladium organometallic precursors (via mask or laser), screen printed or ink-jet deposited palladium compounds or electrophoretic palladium deposition. It should be appreciated that palladium-based activation is presently disclosed merely as an example of activation solutions that often work well with activation for exposed tab portions formed of nickel or an alloy thereof. However, it should be understood that other activation solutions may also be utilized.

Also, in lieu of or in addition to the aforementioned activation step, the activation dopant may be introduced into the conductive material when forming the electrode layers of the capacitor. For instance, when the electrode layer comprises nickel and the activation dopant comprises palladium, the palladium dopant may be introduced into the nickel ink or composition that forms the electrode layers. Doing so may eliminate the palladium activation step. It should be further appreciated that some of the above activation methods, such as organometallic precursors, also lend themselves to co-deposition of glass formers for increased adhesion to the generally ceramic body of the capacitor. When activation steps are taken as described above, traces of the activator material may often remain at the exposed conductive portions before and after termination plating.

Additionally, post-treatment steps after plating may also be employed. Such steps may be conducted for a variety of purposes, including enhancing and/or improving adhesion of the materials. For instance, a heating (or annealing) step may be employed after performing the plating step. Such heating may be conducted via baking, laser subjection, UV exposure, microwave exposure, arc welding, etc.

As indicated herein, the external termination may include at least one plating layer. In one embodiment, the external termination may comprise only one plating layer. However, it should be understood that the external terminations may comprise a plurality of plating layers. For instance, the external terminations may comprise a first plating layer and a second plating layer. In addition, the external terminations may also comprise a third plating layer. The materials of these plating layers may be any of the aforementioned and as generally known in the art.

For instance, one plating layer, such as a first plating layer, may comprise copper or an alloy thereof. Another plating layer, such as a second plating layer, may comprise nickel or an alloy thereof. Another plating layer, such as a third plating layer, may comprise tin, lead, gold, or a combination, such as an alloy. Alternatively, an initial plating layer may include nickel, following by plating layers of tin or gold. In another embodiment, an initial plating layer of copper may be formed and then a nickel layer.

In one embodiment, initial or first plating layer may be a conductive metal (e.g., copper). This area may then be covered with a second layer containing a resistor-polymeric material for sealing. The area may then be polished to selectively remove resistive polymeric material and then plated again with a third layer containing a conductive, metallic material (e.g., copper).

The aforementioned second layer above the initial plating layer may correspond to a solder barrier layer, for example a nickel-solder barrier layer. In some embodiments, the aforementioned layer may be formed by electroplating an additional layer of metal (e.g., nickel) on top of an initial electrolessly or electrolytically plated layer (e.g., plated copper). Other exemplary materials for layer the aforementioned solder barrier layer include nickel-phosphorus, gold, and silver. A third layer on the aforementioned solder-barrier layer may in some embodiments correspond to a conductive layer, such as plated Ni, Ni/Cr, Ag, Pd, Sn, Pb/Sn or other suitable plated solder.

In addition, a layer of metallic plating may be formed followed by an electroplating step to provide a resistive alloy or a higher resistance metal alloy coating, for example, electroless Ni—P alloy over such metallic plating. It should be understood, however, that it is possible to include any metal coating as those of ordinary skill in the art will understand from the complete disclosure herewith.

It should be appreciated that any of the aforementioned steps can occur as a bulk process, such as a barrel plating, fluidized bed plating and/or flow-through plating termination processes, all of which are generally known in the art. Such bulk processes enable multiple components to be processed at once, providing an efficient and expeditious termination process. This is a particular advantage relative to conventional termination methods, such as the printing of thick-film terminations that require individual component processing.

As described herein, the formation of the external terminations is generally guided by the position of the exposed edges of the electrodes. Such phenomena may be referred to as "self-determining" because the formation of the external plated terminations is determined by the configuration of the exposed conductive metal of the electrode layers at the selected peripheral locations on the capacitor. In some embodiments, the capacitor may include "dummy tabs" to provide exposed conductive metal along portions of the monolithic body of the capacitor.

It should be appreciated that additional technologies for forming capacitor terminals may also be within the scope of the present technology. Exemplary alternatives include, but are not limited to, formation of terminations by plating, magnetism, masking, electrophoretics/electrostatics, sputtering, vacuum deposition, printing or other techniques for forming both thick-film or thin-film conductive layers.

Referring back to the figures and in particular FIG. 1C, in some embodiments, the first external termination 118 may have a first longitudinal edge 122. The edge may be offset in the longitudinal direction 132 and face away from end surface 26. The second external termination 120 may have a second longitudinal edge 124. The edge may be offset in the longitudinal direction and face away from end surface 28. The second longitudinal edge 124 may be offset in the longitudinal direction 132 from the first longitudinal edge 122 by an external termination gap distance 39. In this regard, the external termination gap distance 39 may be formed in the longitudinal direction 132.

The external termination gap distance may be about 100 µm or more, such as about 150 µm or more, such as about 200 µm or more, such as about 300 µm or more, such as about 400 µm or more, such as about 500 µm or more, such as about 600 µm or more. The external termination gap distance may be about 1,000 µm or less, such as about 900 µm or less, such as about 800 µm or less, such as about 700 µm or less, such as about 600 µm or less.

Referring to FIG. 1C, in some embodiments, the multilayer ceramic capacitor 100 may have a capacitor length 37 in the longitudinal direction 132 between the ends of the capacitor. The capacitor length may be about 600 µm or more, such as about 700 µm or more, such as about 800 µm or more, such as about 900 µm or more, such as about 1,000 µm or more, such as about 1,200 µm or more, such as about 1,400 µm or more. The capacitor length may be about 3,000 µm or less, such as about 2,500 µm or less, such as about 2,200 µm or less, such as about 1,800 µm or less, such as about 1,600 µm or less, such as about 1,500 µm or less, such as about 1,400 µm or less, such as about 1,300 µm or less, such as about 1,200 µm or less, such as about 1,100 µm or less. Accordingly, in one embodiment, a ratio of the external termination gap distance 39 to the capacitor length 37 may be 0.1 or more, such as 0.2 or more, such as 0.3 or more, such as 0.4 or more, such as 0.5 or more, such as 0.6 or more, such as 0.7 or more. The ratio may be 0.9 or less, such as 0.8 or less, such as 0.7 or less, such as 0.6 or less, such as 0.5 or less.

Similarly, in some embodiments, the stacked body 101 of the capacitor 100 may have a body length 47 in the longitudinal direction 132 between the end surfaces 26, 28 of the capacitor. The body length may be about 600 µm or more, such as about 700 µm or more, such as about 800 µm or more, such as about 900 µm or more, such as about 1,000 µm or more, such as about 1,200 µm or more, such as about 1,400 µm or more. The body length may be about 3,000 µm or less, such as about 2,500 µm or less, such as about 2,200 µm or less, such as about 1,800 µm or less, such as about 1,600 µm or less, such as about 1,500 µm or less, such as about 1,400 µm or less, such as about 1,300 µm or less, such as about 1,200 µm or less, such as about 1,100 µm or less. Accordingly, in one embodiment, a ratio of the external termination gap distance 39 to the body length 37 may be 0.1 or more, such as 0.2 or more, such as 0.3 or more, such as 0.4 or more, such as 0.5 or more, such as 0.6 or more, such as 0.7 or more. The ratio may be 0.9 or less, such as 0.8 or less, such as 0.7 or less, such as 0.6 or less, such as 0.5 or less.

In one embodiment, the capacitor 100, or a portion thereof, may be symmetric about a longitudinal centerline that extends in the longitudinal direction 132. In another embodiment, the capacitor 100, or a portion thereof, may be symmetric about a lateral centerline that extends in the lateral direction 134. In a further embodiment, the capacitor 100, or a portion thereof, may be symmetric about a Z-direction centerline that extends in the Z-direction 136.

Aspects of the present disclosure are directed to a multilayer ceramic capacitor, for example one having a relatively low equivalent series resistance. In one embodiment, the capacitor may exhibit orientation sensitive characteristics. For instance, the multilayer ceramic capacitor can exhibit an equivalent series resistance in a second orientation that is about 5% or more, such as about 10% or more, such as about 15% or more, such as about 20% or more than an equivalent series resistance in a first orientation. In the first orientation, the longitudinal direction 132 of the multilayer ceramic capacitor 100 may be parallel with the mounting surface 110 (for example as illustrated in FIGS. 1D-1F). In the first orientation, the electrodes (e.g., electrodes 106, 108) may be generally perpendicular with the mounting surface 110. In the second orientation, the multilayer ceramic capacitor 100 may be rotated 90 degrees about the longitudinal direction 132 with respect to the first orientation. Thus, in the second orientation, the electrodes (e.g., electrodes 106, 108) may be generally parallel with the mounting surface 110. Meanwhile, the capacitor 100 may exhibit comparable equivalent series resistance characteristics in the first orientation (as illustrated) to a third orientation, in which the capacitor 100 is rotated 180 degrees about the longitudinal direction 132 (appearing substantially similar as illustrated).

The disclosed capacitor may be used in a variety of applications. For example, these applications may include those related to communications. These may include 5G, mobile devices, devices requiring high frequency communications, base stations, V2X (vehicle to everything technologies), etc. These applications may also include power trains, safety equipment, ADAs, etc.

Testing Methods

A testing assembly can be used to test performance characteristics, such as equivalent series resistance, of a capacitor according to aspects of the present disclosure. For example, the capacitor can be mounted to a test board. An input line and an output line can each be connected with the test board. The test board can include microstrip lines, or test traces, electrically connecting the input line and output lines with respective external terminations of the capacitor. The test traces can be spaced apart by about 0.432 mm (0.017 in) or by about 0.610 mm (0.024 in).

An input signal can be applied to the input line using a source signal generator (e.g., a 1806 Keithley 2400 series Source Measure Unit (SMU), for example, a Keithley 2410-C SMU) and the resulting output signal of the capacitor can be measured at the output line (e.g., using the source signal generator). The equivalent series resistance can be determined over a frequency range of from 1 GHz to 10 GHz. This test method can be repeated for multiple capacitors having the same design and nominal dimensions.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A multilayer ceramic capacitor having a first end and a second end that is spaced apart from the first end in a longitudinal direction that is perpendicular to a lateral direction, the lateral direction and longitudinal direction each being perpendicular to a Z-direction, the multilayer ceramic capacitor comprising:
a stacked body comprising a plurality of dielectric layers and a plurality of electrode layers parallel with the lateral direction;
wherein at least one electrode layer includes a first electrode comprising a connecting portion and a central portion extending from the connecting portion in the longitudinal direction, wherein the central portion includes a Z-directional edge and the connecting portion includes an edge extending in both the longitudinal direction and the Z-direction, wherein the Z-directional edge of the central portion forms a first angle of from greater than 90° to less than 180° with the edge of the connecting portion wherein the edge of the connecting portion is a linear edge;
wherein the first electrode further comprises a base portion, wherein the connecting portion extends from the base portion in the longitudinal direction, and wherein the base portion includes a longitudinal edge, wherein the longitudinal edge of the base portion forms a second angle of from 90° to less than 180° with the edge of the connecting portion;
a first external termination disposed along the first end and a second external termination disposed along the second end.

2. The multilayer ceramic capacitor of claim 1, wherein the first angle is from 100° to 160°.

3. The multilayer ceramic capacitor of claim 1, wherein the base portion of the first electrode is electrically connected with the first external termination, wherein the connecting portion extends from the base portion in the longitudinal direction.

4. The multilayer ceramic capacitor of claim 3, wherein the base portion of the first electrode has a longitudinal edge extending in the Z-direction and a length extending in the longitudinal direction and wherein the first external termination has a first longitudinal edge extending in the lateral direction, wherein the first longitudinal edge of the first external termination is within 5% of the longitudinal edge of the base portion based on the length of the base portion.

5. The multilayer ceramic capacitor of claim 1, wherein the second angle is from 110° to 150°.

6. The multilayer ceramic capacitor of claim 1, wherein the second angle is from 100° to 160°.

7. The multilayer ceramic capacitor of claim 1, wherein the stacked body has a body length in the longitudinal direction between the first end and the second end of the multilayer ceramic capacitor and wherein the first external termination has a first longitudinal edge and the second external termination has a second longitudinal edge wherein the second longitudinal edge is offset in the longitudinal direction from the first longitudinal edge by an external termination gap distance, wherein a ratio of the body length to the external termination gap distance is from 0.2 to 0.8.

8. The multilayer ceramic capacitor of claim 1, wherein the multilayer ceramic capacitor is symmetric in the lateral direction about a longitudinal centerline that extends in the longitudinal direction.

9. The multilayer ceramic capacitor of claim 1, wherein the multilayer ceramic capacitor is symmetric in the Z-direction about a lateral centerline that extends in the lateral direction.

10. The multilayer ceramic capacitor of claim 1, wherein the multilayer ceramic capacitor is configured for mounting to a mounting surface such that the electrode layers are perpendicular with the mounting surface.

11. The multilayer ceramic capacitor of claim 1, wherein the at least one of the electrode layers comprises a second electrode comprising a base portion electrically connected with the second external termination and wherein a central end gap distance is formed in the longitudinal direction between the central portion of the first electrode and the base portion of the second electrode.

12. The multilayer ceramic capacitor of claim 1, wherein the first electrode comprises copper.

13. The multilayer ceramic capacitor of claim 1, wherein the at least one electrode layer further comprises a second electrode, wherein the first electrode and the second electrode comprise copper.

14. The multilayer ceramic capacitor of claim 1, wherein the dielectric layers comprise an NPO material.

15. The multilayer ceramic capacitor of claim 1, wherein the dielectric layers comprise a titanate.

16. The multilayer ceramic capacitor of claim 15, wherein the dielectric layers further comprise an oxide.

17. The multilayer ceramic capacitor of claim 1, wherein the multilayer ceramic capacitor exhibits an equivalent series resistance that is less than about 30 Ohms at 10 GHz.

18. The multilayer ceramic capacitor of claim 1, wherein the multilayer ceramic capacitor exhibits an equivalent series resistance that is less than about 20 Ohms at 5 GHz.

19. The multilayer ceramic capacitor of claim 1, wherein the multilayer ceramic capacitor exhibits an equivalent series resistance that is less than about 10 Ohms at 3 GHz.

20. The multilayer ceramic capacitor of claim 1, wherein the multilayer ceramic capacitor exhibits an equivalent series resistance of from about 0.1 Ohms to about 30 Ohms from about 2 GHz to about 10 GHz.

21. The multilayer ceramic capacitor of claim 1, wherein the multilayer ceramic capacitor exhibits an equivalent series resistance of from about 2 Ohms to about 20 Ohms from about 4 GHz to about 10 GHz.

* * * * *